United States Patent [19]

Shartrand

[11] 3,739,208

[45] June 12, 1973

[54] REVERSE FLOW COOLING SYSTEM FOR A DYNAMOELECTRIC MACHINE

[75] Inventor: Allan C. Shartrand, Scotia, N.Y.

[73] Assignee: General Electric Company, Schenectady, N.Y.

[22] Filed: Dec. 3, 1971

[21] Appl. No.: 204,582

[52] U.S. Cl. .................................................. 310/58
[51] Int. Cl. .................................................. H02k 9/00
[58] Field of Search .................. 310/52, 58, 55–57, 310/61, 59, 62–64; 307/156

[56] References Cited
UNITED STATES PATENTS

| | | | |
|---|---|---|---|
| 3,110,827 | 11/1963 | Baudry | 310/55 |
| 2,695,368 | 11/1954 | Kilbourne | 310/64 |
| 3,271,600 | 9/1966 | Philofsky | 310/55 |
| 3,091,710 | 5/1963 | Shartrand | 310/55 |
| 3,348,081 | 10/1967 | Willyoung | 310/55 |
| 3,005,115 | 10/1961 | Adamsheck | 307/156 |
| 2,986,664 | 5/1961 | Willyoung | 310/61 |
| 1,672,680 | 6/1928 | Freiburghouse | 310/57 |

Primary Examiner—R. Skudy
Attorney—William C. Crutcher and James W. Mitchell

[57] ABSTRACT

A dynamoelectric machine with internal gas cooling system has a reverse flow pattern with gas flowing from the fan through the coolers and then to the parts to be cooled. The gas is separated into two flow portions at the cooler, one portion undergoing a low pressure drop and then serving to cool the rotor end turns and transition section, the other undergoing a relatively high pressure drop and then serving to cool the stator core and to supply the gas gap for "gap pickup" cooling of the rotor body.

8 Claims, 1 Drawing Figure

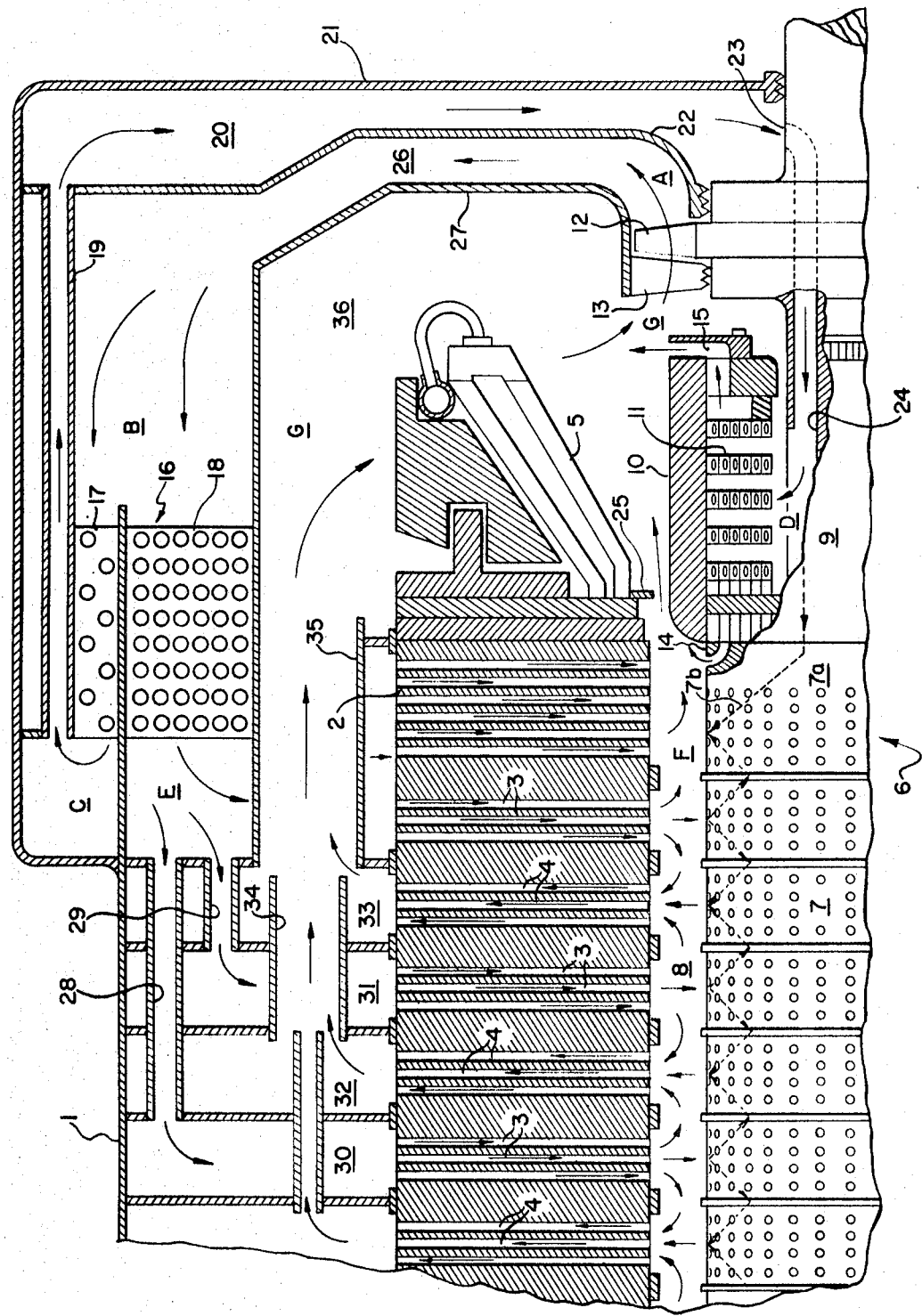

REVERSE FLOW COOLING SYSTEM FOR A DYNAMOELECTRIC MACHINE

BACKGROUND OF THE INVENTION

This invention relates to large gas-cooled dynamoelectric machines with internal cooling systems, and more generally relates to large generators with radial flow cooling of the stator core and employing the "gap pickup" method of cooling the rotor.

As the ratings of large dynamoelectric machines such as turbine-generators on the order of 800 MW or more have developed, it has become increasingly difficult to obtain proper cooling of the rotor and stator windings and other parts of the machine. Systems have been developed for flowing liquid and gaseous coolants inside the winding conductors, as disclosed in U.S. Pat. No. 2,695,368 to C. E. Kilbourne. Effective methods for cooling the rotor windings by coolant picked up from the gas gap by pumping action of the rotor are disclosed in U.S. Pat. No. 3,348,081 to D. M. Willyoung.

One of the more difficult portions of the rotor winding to cool properly is the rotor end turn region beneath the retaining ring holding the windings in place and the transition section in the end part of the body portion of the rotor. Although constructions have been suggested for improving cooling of the end turn windings and transition section, these are always dependent upon the pressure drop which is available to force the cooling gas to flow through the end turn and transition region.

A construction is disclosed in U.S. Pat. No. 1,672,680 to E. H. Freiburghouse in which the cooling gas in an aircooled generator flows in a reverse direction from the conventional pattern, going to the coolers before it flows to the machine parts to be cooled. In that patent, the gas flow divides into two paths, one path flowing to the air gap through the stator and the other portion flowing to the air gap through the rotor body. The aforesaid construction used air and did not cool the windings internally, but merely flowed air over the rotor body and stator core themselves. Much higher pressure heads could be developed in air than in hydrogen, which is the most commonly used gaseous coolant today.

Another arrangement in the prior art which requires high-pressure multistage blowers to obtain the necessary pressure differentials for cooling with hydrogen gas is disclosed in U.S. Pat. No. 3,110,827 to R. A. Baudry. This patent shows a reverse flow of gas to the cooler, the rotor end turn portion of the cooling gas undergoing a higher pressure drop by passing through two sections of the cooler, while the stator portion of the cooling gas undergoes a lower pressure drop by passing through only one section of the cooler. The remainder of the rotor coolant pressure head is necessary to force the gas through the partitioned rotor winding cooling passages.

The aforesaid reverse flow constructions either use air as the coolant (which causes too much power loss due to windage) or requires a high-pressure blower. A construction would be desirable in which high pressure drops could be obtained across the rotor end turn and transition cooling region in machines of the "gap pickup" type depending upon the pumping action of the rotor for the rotor cooling and using low-pressure fans.

Accordingly, one object of the present invention is to provide an improved dynamoelectric machine cooling construction for enhancing cooling of the rotor end turns and transition section.

Another object of the invention is to provide an improved cooling arrangement in a generator of the type using gap pickup cooling and low-pressure fans.

SUMMARY OF THE INVENTION

Briefly stated, the invention is practiced by reversing the cooling flow and dividing the flow into two portions. One portion is cooled and undergoes only a low pressure drop before entering into the rotor end turn region. The other portion is cooled and undergoes a relatively high pressure drop before it cools the stator core and supplies the gas gap. A greater pressure head is thus developed across the rotor end turn and transition cooling passages to provide more effective cooling.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with accompanying drawing, in which the single FIGURE is an elevation view, in section, of the top half of a dynamoelectric machine at one end thereof, the other end being identical.

DESCRIPTION OF THE PREFERRED EMBODIMENT

Referring to the drawing, a dynamoelectric machine has a gas-tight casing 1 containing hydrogen cooling gas. A stator core 2 of laminations or punchings is constructed in conventional manner with the punchings arranged in packages of short axial length with radial cooling passages 3, 4 provided therebetween by means of suitably arranged spacers. Generator core 2 has slots containing a main armature winding 5 cooled by a separate liquid cooling system which is not material to the present invention.

Within the stator casing 1 is a rotor 6 having a body portion 7 spaced from the stator 2 by a gas gap 8. Rotor 6 also has an end turn portion 9 at either end thereof which includes a retaining ring 10 holding the end turns 11 in place. A transition section 7a at the end of rotor body 7 receives its cooling gas from the end of the rotor. The rotor carries a set of fan blades 12 into which gas is guided by stationary vanes 13.

The body portion 7 of the rotor is cooled by gas picked up from the gas gap 8 in the manner of the aforementioned Willyoung U.S. Pat. No. 3,348,081. Gas is directed to an axially spaced section along the gas gap through internal diagonal cooling passages through the rotor windings, a suitable construction being disclosed in U.S. Pat. No. 2,986,664 to D. M. Willyoung and P. A. Becker which is assigned to the present assignee and incorporated herein by reference. There is no substantial pressure difference along the gas gap 8 between the inlet and outlet zones.

The end turn region 9 is arranged with internal baffling and cooling passages through the end windings 11 leading to an outlet 14 into the gas gap. A suitable arrangement for accomplishing this is disclosed in U.S.

Pat. No. 3,005,119 to N. Schmitt and D. M. Willyoung, assigned to the present assignee and incorporated herein by reference.

Cooling of the transition section 7a is accomplished by gas in the end turn region which passes through a subslot (not shown) to the gas gap 8, joining gas from outlet 14, as shown schematically by dotted arrow 7b.

Additional cooling of the end region 11 may be accomplished by means of centrifugal fan blades 15 disposed at the end of retaining ring 10 and connected by internal passages to the chamber beneath the retaining ring. A suitable construction is disclosed in U.S. Pat. No. 3,225,231, assigned to the present assignee and incorporated herein by reference.

In accordance with the present invention, a dual cooler 16 is disposed in the casing 1. The cooler is divided into two sections, one section 17 providing a relatively low pressure drop as it cools the gas flowing therethrough, and the other section 18 providing a relatively high pressure drop. This relative difference in pressure drops may be provided by means well known to those skilled in the art, such as by more densely packing the cooling tubes in section 18 than in section 17 as schematically illustrated in the drawing, or by making section 18 of longer length, or by providing suitable downstream and/or upstream restrictions for section 18. It should be apparent that the dual cooler 16, though illustrated as a horizontal transverse cooler in the arrangement shown, could also be vertical or extend longitudinally, the particular physical arrangement of the cooler sections not being material to the present invention. Sections 17 and 18, although shown as part of a single cooler for convenience of connecting piping, could also be separated and placed in separate portions of the flow path.

A series of internal baffles and flow-guiding tubes serve to guide the gas in the desired flow paths. These are illustrated schematically in the drawing, it being understood that in actual machines, the flow often takes circuitous paths through suitably arranged baffles and openings, the exact details of such an arrangement not being material to the present invention.

As illustrated herein, a first path is provided from the low-pressure section 17 of the cooler through one or more tubes 19 to an end chamber 20 formed between a casing end wall 21 and a flow-dividing wall 22. Openings 23 into the rotor shaft lead through internal longitudinal passages 24 beneath fan 12 into the end turn region beneath retaining ring 10. Part of this gas cools the transition region 7a (see flow arrow 7b) and the other part cools the end turns leaving through opening 14. These two flows leave the gas gap, flowing past a flow-restricting baffle 25 and re-join the remainder of the gas from centrifugal blades 15 at the suction side of fan 12. The gas then flows through an end passage 26 provided between walls 22 and 27 back to cooler 16.

The other main flow of gas from the high-pressure cooler section 18 is distributed longitudinally along the stator by means of tubes such as 28, 29 and is distributed into alternating circumferential inlet chambers 30, 31 around stator core 2. Because of the great number of parallel flow paths to the gas gap the pressure drop from cooler 18 to the gas gap is relatively low. Alternating between the circumferential inlet chambers 30, 31 are outlet chambers 32, 33 from which gas is collected and moved longitudinally in tubes 34, 35 to the stator end turn region 36 and thence to the suction side of fan 12. From there it flows back to cooler 16.

OPERATION

The operation of the invention can best be described by following the two gas flow paths from one pressure region to the next. The letters A through G are used to designate successively lower pressure regions relative to the head developed across fan 12. From region A at the outlet of fan 12, the total gas flows to region B at the inlet to the cooler sections 17, 18. One part of the gas undergoes a relatively low pressure drop B–C through section 17 to a pressure region C and then flows into end passage 20, through the rotor longitudinal passage 24 into a pressure region D beneath the retaining ring. These passages connecting region C to D constitute first conduit means.

With reference to the other portion of gas at the cooler, the gas flowing through section 18 undergoes a relatively large pressure drop B–E to a pressure region E and then flows into the peripheral chambers 30, 31. Then it flows into pressure region F in the gas gap 8 through the radial cooling passages 3 undergoing a relatively low pressure drop E–F. These passages connecting region E to F constitute second conduit means. After the gas in the gap 8 has been scooped up to cool the rotor and returned to the gap, it flows from pressure region F radially outward in passages 4 and is returned to the stator end region G which is substantially at a pressure corresponding to the low-pressure side of fan 12. These passages connecting region F to G via passages 4 constitute third conduit means. A portion of the gas from the gap 8 also flows past the restricted baffle 25 to pressure region G. The passage connecting region F to G via the baffle 25 constitutes fourth conduit means. Both of these pressure drops F–G are relatively low.

It will be observed that a large static pressure head D–F is available to force gas from the space beneath the retaining ring to gas gap 8 through opening 14, [and holes from transition section (not shown)] in addition to any additional pumping head developed by the rotor itself. In addition, there is an even greater pressure head D–G available to force gas through the end turn winding passages leading to the centrifugal blades 15. These passages from region D to G via the centrifugal blades 15 constitute fifth conduit means. The existence of this pressure head across the end turn windings and transition section at the end of the body, separate from the main body portion cooling of the rotor (accomplished only by the pumping action of the rotor) aids to more effectively cool the end turn windings. The means by which this additional head is developed in the critical end turn and transition region is preferably by means of the dual cooler, by virtue of its separate section for cooling the gas flowing through the end turn cooling circuit.

As will be apparent to those skilled in the art, a greater pressure drop in the cooling circuit feeding the stator core and air gap can also be accomplished by introducing restrictions in or by properly sizing tubes 28, 29 and it is intended to cover these modifications in the present invention. The restriction to induce higher pressure drop could also be incorporated into the stator core inlet ducts, 3, themselves. However, the preferred means of introducing differences in the gas pressure drop is within the cooler itself.

While there has been disclosed herein what is considered to be the preferred embodiment of the invention, other modifications may occur to those skilled in the art, and it is intended to cover in the appended claims all such modifications as fall within the true spirit and scope of the invention.

What is claimed is:

1. In a dynamoelectric machine of the type having a gas-tight casing filled with cooling gas, a stator core with radial cooling ducts, a rotor defining a gas gap with the stator core and having a body portion cooled by pumping action from the gas gap and an end turn portion, said rotor having fan means mounted thereon for circulating the cooling gas, the improvement comprising:

first and second cooler sections disposed within said casing communicating directly with the outlet of said fan to cool the gas therefrom, said first cooler section being arranged and proportioned to cause a lower pressure drop of the gas flowing therethrough than said second cooler section, first conduit means conducting gas from said first cooler section to said rotor end turn portion, second conduit means conducting gas from said second cooler section and through selected stator radial cooling ducts to the gas gap, the flow path through the first cooler section and the first conduit means being arranged and proportioned to provide a lower gas pressure drop than the flow path through the second cooler section and the second conduit means, whereby a remaining pressure drop is available between the end turn portion and the gas gap for forcing cooling gas through the end turn portion.

2. The combination according to claim 1, further including a baffle in the gas gap and fourth conduit means providing a restricted flow path from said gas gap past said baffle to the suction side of the fan means, whereby a still greater pressure drop is available between said end turn portion and the suction side of the fan means to force cooling gas through the end turn portion.

3. The combination according to claim 1, further including third conduit means from the gas gap through other stator radial cooling ducts to the suction side of the fan means.

4. The combination according to claim 1, wherein the first cooler section has cooling tubes therein less densely packed than cooling tubes disposed in said second cooling section.

5. The combination according to claim 1, wherein said first conduit means includes a longitudinal passage through the rotor beneath said fan means.

6. In a dynamoelectric machine of the type having a gas-tight casing filled with cooling gas, the combination comprising:

a stator core defining spaced groups of alternating inlet and outlet radial cooling ducts, a rotor mounted within the casing and defining a gas gap with said stator core, said rotor having a body portion arranged with means to scoop gas from the gap and return it at an axially spaced location, said rotor further including end turn and transition portions defining first internal gas cooling passages through the rotor end turn and transition portions communicating with the gas gap, fan means mounted on said rotor, first and second cooler sections disposed within said casing, said first cooler section being arranged to provide a lower pressure drop for gas flowing therethrough than the second cooler section, first conduit means defining a flow path with a relatively low pressure drop from said first cooler section into the rotor, and second conduit means defining a flow path with a relatively low pressure drop from said second cooler section through the radial inlet stator cooling ducts to the gas gap, whereby an additional pressure drop is available to force gas through said first internal cooling passages to the gas gap.

7. The combination according to claim 6, further including third conduit means providing a flow path from said gas gap through the outlet radial cooling ducts to the suction side of the fan means, and fifth conduit means including second internal cooling passages in the rotor body end portion through the end windings directly to the suction side of the fan means.

8. The combination according to claim 7, further including a baffle in the gas gap and fourth conduit means providing a restricted flow path from the gas gap past said baffle to the suction side of the fan means.

* * * * *